US012008849B2

(12) United States Patent
Ko

(10) Patent No.: US 12,008,849 B2
(45) Date of Patent: Jun. 11, 2024

(54) INTELLIGENT LOCKS AND KEYS

(71) Applicant: Brilliant Guard Limited, Hong Kong (CN)

(72) Inventor: Ping Hon Ko, Hong Kong (CN)

(73) Assignee: Brilliant Guard Limited, Hong Kong (CN)

( * ) Notice: Subject to any disclaimer, the term of this patent is extended or adjusted under 35 U.S.C. 154(b) by 48 days.

(21) Appl. No.: 17/772,510

(22) PCT Filed: Dec. 14, 2020

(86) PCT No.: PCT/IB2020/061882

§ 371 (c)(1),
(2) Date: Apr. 27, 2022

(87) PCT Pub. No.: WO2021/117017

PCT Pub. Date: Jun. 17, 2021

(65) Prior Publication Data

US 2022/0406107 A1 Dec. 22, 2022

(30) Foreign Application Priority Data

Dec. 13, 2019 (HK) ................................ 19133604.9

(51) Int. Cl.
*G07C 9/00* (2020.01)

(52) U.S. Cl.
CPC ................................ *G07C 9/00309* (2013.01)

(58) Field of Classification Search
None
See application file for complete search history.

(56) References Cited

U.S. PATENT DOCUMENTS 10,252,699 B2 * 4/2019 Schoula .................. H04L 9/088
2018/0081335 A1 3/2018 Davis
2018/0370488 A1 12/2018 Schoula et al.

FOREIGN PATENT DOCUMENTS

CN 105989644 A 10/2016
CN 107313660 A 11/2017
CN 107404484 A 11/2017
CN 207761449 U 8/2018
CN 209585872 U 11/2019
WO 2018184070 A1 10/2018

OTHER PUBLICATIONS

International Search Report of PCT Patent Application No. PCT/IB2020/061882 dated Apr. 15, 2021.
Extended European Search Report of Counterpart European Patent Application No. 20897725.6 dated May 12, 2023.

* cited by examiner

*Primary Examiner* — Carlos Garcia

(57) ABSTRACT

The lock (100) comprises a controller, a data storage device, a lock mechanism operable by the controller in a locked state or an unlocked state, and a data communication frontend comprises a first data port (108) and a second data port; Wherein the controller is configured to enter into data communication via second data port after successful completion of data communication via the first data port (108). An electronic key (200) comprises a key controller, a data storage device, a power source and a data communication frontend comprising a first data port (202) and a second data port; wherein the electronic key (200) is a physical key having a key body and is configured to work with the lock (100).

19 Claims, 10 Drawing Sheets

100

INTELLIGENT LOCKS AND KEYS

FIELD OF DISCLOSURE

The present disclosure relates to intelligent locks and intelligent keys, and more particularly to locks having a lock mechanism operable by intelligent electronic circuitry and electronic keys therefor.

BACKGROUND

Intelligent locks are electronic locks having a lock mechanism which is operable by electronic circuitry. Electronic locks enjoy increasing popularity because of its flexibility and enhance security. With the increasing use of intelligent locks, improved intelligent locks and keys are advantageous.

SUMMARY OF DISCLOSURE

A lock comprising a controller, a data storage device, a lock mechanism operable by the controller in a locked state or an unlocked state, and a data communication frontend comprising a first data port and a second data port is disclosed. The controller is configured to enter into data communication via the second data port after successful completion of data communication via the first data port.

The controller may be configured to receive identification data via the first data port and to receive operational data messages via the second data port, and wherein the controller may be configured to not to receive operational data messages via the second data port if the identification data received via the first data portion does not meet an admission criterion.

The controller may be configured to conduct unencrypted data communication via the first data port and encrypted data communication via the second data port.

An electronic key configured to work with the above lock is disclosed. The electronic key comprises a key controller, a data storage device, a power source and a data communication frontend comprising a first data port and a second data port. The electronic key is a physical key having a key body.

The key controller may be configured to send identification data via the first data port and to transmit operational data messages via the second data port after a positive response indicating admissibility is received via the first data port.

DESCRIPTION OF FIGURES

The present disclosure is described by way of example and with reference to the accompanying figures, in which.

DETAILED DESCRIPTION

Figure 1:
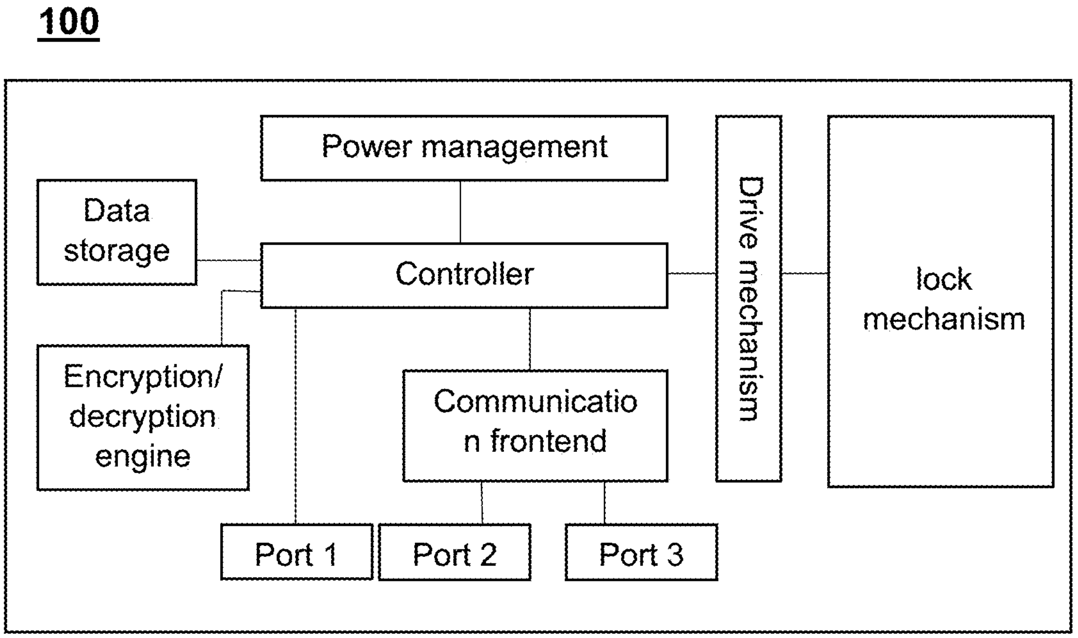
FIGS. 1 and 1A are block diagrams of example locks of the present disclosure.

A lock of the present disclosure comprises electronic circuitries including a controller, a data storage device, a lock mechanism operable by the controller, a data communication frontend comprising a first port which is a first data communication port and a second port which is a second data communication port, as shown in FIG. 1. The controller is a lock controller, which may comprise a microprocessor-based solid-state controller (MCU) which is configured to control the lock, including the settings and operations thereof, and peripheral circuities configured to support operation of the MCU. The data storage device is for storing digital data, especially data in relation to the settings and operations of the lock, and may comprise volatile memories such as RAM and/or non-volatile member such as ROM or EPROM. The data storage device is in data communication connection with the controller so that data can be stored in the data storage device by the controller, and data stored in the data storage can be retrieved by the controller. The lock mechanism is operable in a first state in which the lock is in a locked state and a second state in which the lock is in an unlocked state. The data communication frontend, including the data ports thereof, is in data communication connection with the controller and is configured to facilitate data communication between the lock and an external device such as a key in cooperation with the controller. The electronic circuitries may comprise peripheral circuitries such as analog-to-digital converter, power management circuits, and other optional circuitries. The data communication herein means electronic data communication and may be wired and/or wireless. To facilitate wireless data communication, the electronic circuitries may comprise a wireless data transceiver.

The first port is a data communication port which is configured for data communication of a first type of data and the second data port is a data communication port which is configured for data communication of a second type of data different to the first, and the difference between the first and second data types may be in data nature, data format, data speed and/or data modulation.

In example embodiments, the lock controller is configured to perform a first procedure via the first data port prior to entering into a second procedure via the second data port. The first procedure may be a validation procedure during which the controller operates to determine whether data coming in from the first data port meet validation requirements. If outcome of the validation procedures is positive, that is, successful, the in-coming data is determined by the controller as coming in from an eligible object and the lock controller will proceed to the second procedure. If outcome of the first procedure is negative, that is, unsuccessful, the lock controller will not proceed to the second procedure.

The lock may comprise a third port and the controller may be configured to perform a pre-procedure to determine whether or not to proceed to the first procedure with reference to a signal present at the third port. If the signal present at the third port corresponds to signal of an eligible electronic key, the lock controller will operate to proceed to the first procedure. Otherwise, the lock controller will not proceed to the first procedure.

The lock is configured to work with a key. In example embodiments, a key which is configured to work with a lock would have the identification parameter and the Encryption Key prestored on the key.

The key can be a physical key or a software key which is configured to operate the lock by way of data communication. A software key is a non-dedicated electronic key which is generated by way of execution of application software which is resident on a host machine such as a smart phone, a tablet computer, a notebook computer, a personal computer, and other general-purpose or specific-purpose computer-based machines, and to operate the lock by way of wireless data communication. A physical key is a dedicated electronic key which is configured to operate the lock and the data communication may be wired and/or wireless. A host machine when executing the application software will become an application machine ("APP") having an interface to work with the lock, including sending lock operation instructions and administrative instructions such as key reset.

Figure 2:
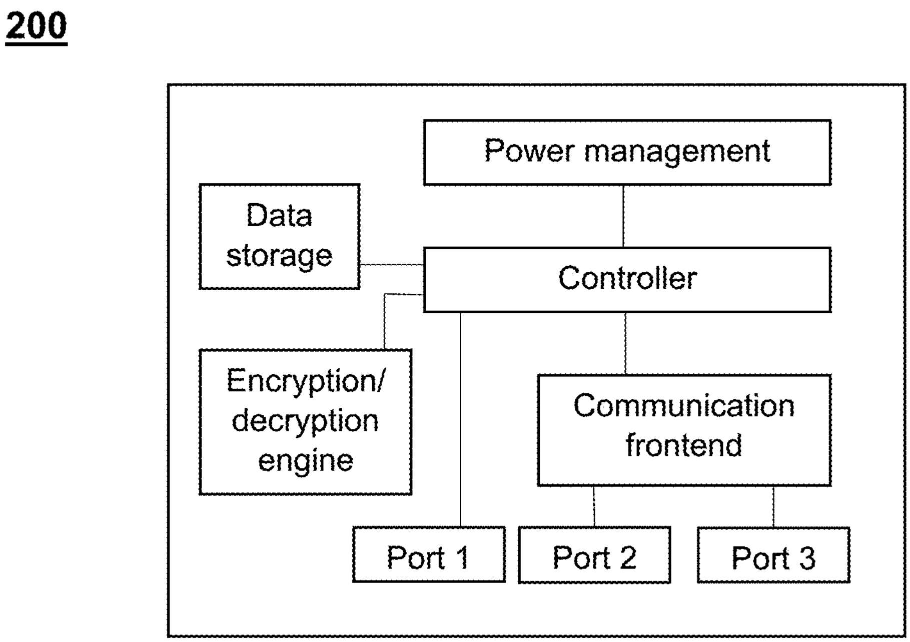
FIGS. 2 and 2A are block diagrams of example hard keys of the present disclosure.

A physical key comprises electronic circuitries including a controller, a data storage device, a data communication frontend comprising a first data port and a second data port, and a key body, as shown in FIG. 2. The first data port of the key is configured to perform data communication with the first data port of the lock and the second data port of the key is configured to perform data communication with the second data port of the lock. Since the first data ports of the key and the lock have to be mutually compatible and the second data ports of the key and the lock have to be mutually compatible, the description on and in relation to controller, the first and second types of data, the data ports, the data storage device, the telecommunication frontends, the controller, etc. are incorporated by reference and to apply mutatis mutandis to the key, for example, with the lock controller renamed as the key controller. Likewise, the description on and in relation to the first procedure, the second procedure, the third procedure, and the third port are incorporated by reference and to apply mutatis mutandis to the key.

The first procedure may be a validation procedure which is designed to determine whether a key is configured for a target lock and whether a target lock has been paired with a key. If the outcome of determination is positive, the key is a qualified key, and the lock and the key are a qualified pair.

The second procedure may be an instruction procedure during which a lock instruction or a plurality of lock instructions are to be sent to the lock, and the lock controller is configured to react to the instruction or instructions upon receipt.

During the first procedure, the key may send an identification parameter to the lock and the lock upon receipt of the identification parameter will determine whether the identification parameter is correct. If the lock controller determines that the identification parameter is correct, the first procedure is successful and the controller will send an acknowledgement response.

If outcome of the first procedure is positive, that is, successful, the lock controller will proceed to the second procedure, that is, to receive lock instructions via the second data port. If the outcome of the validation procedures is negative, that is, unsuccessful, the key is a non-eligible key and the lock controller will not send an acknowledgement response, and will not proceed to the second procedure, that is, the controller will operate to ignore data coming in from the non-eligible key.

The identification parameter of the lock may be stored on the lock, for example, at time of manufacture, that is, ex-factory, to facilitate the validation procedure. The identification parameter should be unique to the lock and may be assigned by the manufacturer, for example, a serial number. The MAC address of the lock may be used as an identification parameter of the lock since the MAC address is recognized as a unique identification of a device.

The third port may be configured as a compatibility signal port for reception of a compatibility signal. If a compatibility signal is detected at the third port, the controller will proceed to the first procedure. For example, the third port of compatible key may be set at a specific voltage and the lock controller on detecting that the specific voltage or a voltage within a specific voltage is present at the third port of the key will make the determination that the key has a valid compatibility signal to be eligible to proceed to the second procedure. Likewise, the third port of compatible lock may be set at a specific voltage and the key controller on detecting that the specific voltage or a voltage within a specific voltage is present at the third port of the lock will make the determination that the lock has a valid compatibility signal to be eligible to proceed to the second procedure.

To determine whether a key is an eligible key having a valid compatibility signal, the third port of an eligible key and the third port of an eligible key lock may be configured to make physical and electrical contact so that the voltage of the third port of the key can be measured by the lock controller and vice versa.

When determining whether a key has a valid compatibility signal, the third port of the lock may have an isolation switch which is operable by the controller to connect the third port with the power circuit of the lock or to isolate the third port from the power circuit, and the lock controller may operate the isolation switch to isolate the third port of the lock from the power circuit when taking signal measurements at the third port to avoid conflict. Likewise, the third port of the key may have an isolation switch which is operable by the controller to connect the third port with the power circuit of the key or to isolate the third port from the power circuit, and the key controller may operate the isolation switch to isolate the third port of the key from the power circuit of the key when taking signal measurements at the third port to avoid conflict.

Data communication between a lock and a key is by way of data packets. An example data packet has 16-bytes of data and each byte has 8 bits of binary data. The data packets comprise two types of data packets, namely, a first type which is referred to as a command packet ("Command Packet") and a second type which is referred to as a response packet ("Response Packet") which is configured to respond to a received command packet.

An example command packet comprises an overhead portion and a payload portion. An example command packet has a 11-byte payload portion (say byte 3 to byte 13) and a 5-byte overhead portion (say bytes 0-2 and bytes 14-15). The payload portion comprises an "array" type data portion containing command parameters and the overhead portion comprises a command packet sequence number (SEQ, 2 bytes), type information ("CMD", command) and a 2-byte checksum ("CSM").

An example response packet comprises an overhead portion and a payload portion. An example command packet has a 10-byte payload portion (say byte 4 to byte 13) and a 6-byte overhead portion (say bytes 0-3 and bytes 14-15). The payload portion comprises an "array" type data portion including response parameters and the overhead portion comprises a response packet sequence number (RSEQ, 2 bytes), type information ("RCM", response), an error field ("ERR", 1 byte) to indicate whether the received command has been successfully performed, and a 2-byte checksum ("CSM").

A command is an instruction which may be classified as a lock operations command, an administration command (or admin command), or an inquiry command. A lock operation instruction is one which is configured to instruct the lock controller to perform lock operations such as locking and unlocking. An administration command is one which is configured to instruct the lock controller to set parameters such as clock time, motor forward time, motor reverse time, timers such as advertising intervals, advertisement disabling time, etc. An inquiry command is one which is configured to instruct the lock controller to return status information of the lock and may comprise commands to get lock status (locked, unlocked, damaged), lock operation records, etc.

A lock instruction may be encrypted to facilitate secured data communication between a key and a corresponding lock which is paired with the key. To facilitate secured data communication, the controller my comprise an encryption and decryption machine. The encryption and decryption machine may be an electronic circuit which is dedicated to perform data encryption and data decryption, for example, according to a data encryption algorithm such as one complying with AES (Advanced Encryption Standard). In example embodiments, the AES 128 standard using 128-bit data (that is, 6-byte data) is employed. To facilitate data encryption and decryption, a data encryption and decryption key is stored in the lock. The data encryption and decryption key ("Encryption Key" or "Decryption Key") may be stored at the time of manufacture or may be installed and stored on the lock by user's initiation post-purchase.

During operations, a user may operate a key to send instructions to the lock via the second data port only. The lock controller upon detection of the instructions will operate in accordance with data contents of the instruction. Where the lock is configured to operate with secured data communication and encrypted instructions, the lock controller will operate to decrypt the encrypted instruction received and to operate according to the decrypted instruction. Where the lock controller is configured to send a response to the key in response to a received instruction, the lock controller will respond by sending a response command or an encrypted response command via the second data port. When an encrypted response command is received, the key controller will operate to decrypt the received encrypted response command and to update lock status where appropriate.

The second data port may be configured for wireless data communication and day-to-day operations of the lock may be by way of wireless data communication via the second data port only, for example when the encryption key is already saved on the lock.

A software key is configured to operate the lock by way of data communication via the second data port only, for example, by wired or wireless data communication.

The lock and a paired key may be configured for Bluetooth® operations, for example, via the second port. A Bluetooth® enabled controller such as the TC35680FSG/TC35681FSG of the Toshiba Corporation may be used as the lock controller and the key controller as a convenient example. The example controller is configured for BTLE (Bluetooth® low energy operation protocol) version 5.0 and is to operate at 2.4 GHz. To be compliant with BTLE protocols, each lock command is preceding by an UUID (universally unique identifier). Of course, the command data format will be different if a different wireless data communication standard is used. In example embodiments, the second data port of the lock may be configured for wireless data communication only.

To operate a lock by a software key which is resident on a host machine, the host machine on execution of the application software will look for the lock to pair, and the pairing can be performed by connection protocols of the communication standard as the identification information of the lock is unknown. After connection has been established, the host machine will send lock instructions to the lock and the lock controller will respond by broadcasting response commands via the second data port, and to perform lock operations where appropriate. When the lock instructions and the response commands are encrypted, the respective controllers will perform decryption to retrieve the embedded data.

To facilitate contact operation of a lock by a physical key, the lock is provided with a key interface and the key is provided with a lock interface which is configured for mated physical engagement with the key interface. The key interface comprises a plurality of terminals including a first terminal which is configured as a first data port and a second terminal which is configured as a third port which is compatibility signal port.

In example embodiments, both the lock interface and the key interface are configured to be physically compatible with the USB micro-B connector standard, although one is configured as a female connector and the other one is configured as a male connector.

The USB connector has 5 terminals, namely terminals 1 to 5. Terminal 1 is configured as a positive voltage terminal which is to be set at a positive voltage $V_{CC}$, terminal 2 is a negative data terminal, terminal 3 is a positive data terminal, terminal 4 is an identification (ID) terminal, and terminal 5 is a reference terminal which is set a ground potential. The positive voltage $V_{CC}$ is rated at 5V, but actual voltage may vary between 4.4V and 5.25V. The positive data terminal is configured as the first data port or data port 1 while the ID terminal is configured as the third port or the compatibility signal port. The ID terminal is configured to be biased at a compatibility signal level, and the compatibility signal level may be different to $V_{CC}$, for example, 3.675V.

In example embodiments, after the physical key has entered into physical and electrical engagement with the lock, the lock controller will perform the pre-procedure via the ID terminal and then the first procedure via the first data port. The first procedure may be performed using USB data communication protocol.

During execution of the first procedure, the key may send the identification parameter of the lock to look for presence of the lock. When the lock receives an incoming data message corresponding to an incoming inquiry looking for presence of the lock, the lock on detecting its own identification parameter will send an acknowledgement response which may include its identification parameter to show presence. In example embodiments, the MAC address is used as the identification parameter since a MAC address is sufficiently unique, and the identification parameter sent is not encrypted.

A physical key or a host machine may include a plurality of softkeys for operating a corresponding plurality of locks and a user may select one of the stored softkeys to pair with a target lock in order to enter into lock instruction data communication with the target lock.

After completion of the first procedure, the lock controller will advertise using BLTE protocol and the physical key will establish data communication connection with the lock whereby lock instructions are sent by the key controller and response commands are sent by the lock controller, all via the second data port and by means of wireless data communication.

In a secured version of the lock, the lock instructions and the response commands are encrypted using the Encryption Key.

In example embodiments, the encryption key (and the decryption key) used by the physical key has a higher authorization level and is different from the encryption key (and the decryption key) used by a host machine. An encryption key having the higher authorization level is referred to herein as an Admin key and the encryption key used by the host machine has a lower authorization level and is referred to as a User Key. Admin commands may be available to an Admin Key but not a User Key to avoid conflict or to enhance lock security.

In example embodiments, the lock will require an Admin Key encrypted lock instruction on detecting that a physical key is in data communication with the lock via the first data port, and to ignore User Key encrypted lock instructions on detecting that a physical key is in data communication with the lock via the first data port.

In example embodiments, data communication via the first data port and data communication via the second data port use different communication standards or protocols. For example, data communication via the first data port may follow USB protocol or NFC protocol while that on the second date portion may be in accordance with Bluetooth® protocol.

In example embodiments, the physical key is configured to provide operating power to the lock when the physical key is in physical and electrical contact with the key interface of the lock. For example, when the lock detects a physical key in physical engagement with its key interface, the lock controller may operate to switch the power management circuitry so that lock mechanism operating power is supplied by the physical key, rather than by internal stored power of the lock.

Where the lock is configured for more secured operation, the physical key is equipped with the Admin Key and lock instructions which are transmitted via the second data port are encrypted with the Admin Key. If the physical key having the Admin Key is removed from physical connection with the key interface after completion of the first procedure and before completion of the second procedure, the lock controller is configured to operate to abort the second procedure. The lock controller may be configured to constantly monitor the compatibility signal port in order to determine continued presence or absence of the physical key.

In example embodiments, that the physical key carries an Admin Key may be readily known by the lock, for example, the identification parameter of the physical key may have been stored on the lock's database.

The User Key or the Admin Key ("Key" collectively) may be pre-stored in the lock and may be made available to the lock retrospectively. A Key which is made available retrospectively is beneficial, for example, the Key may be changed when ownership of the lock changes.

The Key may be set or reset by cooperation between a master key, a host machine running the APP and a server. A master key may be a physical key which is prestored with a default key and the identification parameter of the lock. The default key and the identification parameter of the lock are also stored on the lock and a server which hosts the default keys of many locks. The default key ("Default Key") is an encryption key, or more specifically, a reserved encryption key which is reserved for setting an Admin Key and User Keys.

In order to retrospectively get a KEY, the host machine will need to communicate with the server with an aim of getting the KEY. The information provided by the host machine to the server will include the identification parameter of the lock such as its MAC address. MAC address is used as a convenient example of an identification parameter in the present example and reference to MAC herein may be construed as reference to identification parameter where appropriate. Upon receipt of the request, the server will return a KEY which is encrypted with the Default Key to the host machine. After the host machine has received the Default Key encrypted KEY, the host machine will forward the encrypted Key to the lock and the key and the lock and the key will retrieve the KEY by decryption using the Default Key.

The encrypted Key may be sent by a command Set_Key_Req and the lock controller or key controller from the UUID of the command will realize that this is a Key setup command and will use the Default Key to retrieve the KEY, which is a second encrypted key while the default key is a first encrypted key.

Figure 1A:
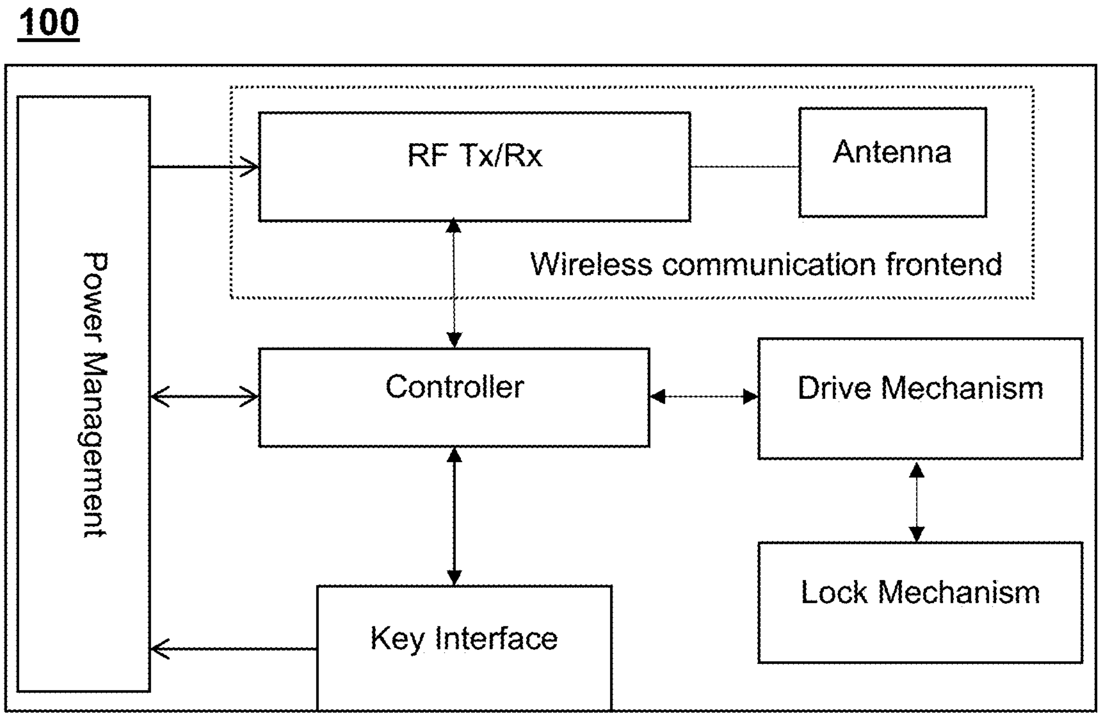

An example lock 100 comprises a lock mechanism, a drive mechanism, electronic circuitries comprising a controller and peripheral circuits including an encryption/decryption engine, a wireless data communication frontend, a key interface, a power management circuit and a main housing, as depicted in FIG. 1A.

The wireless data communication frontend is configured for wireless transmission and wireless reception of data and comprises a radio-frequency transceiver (TX) and an antenna, and. The radio-frequency transceiver is electrically connected intermediate the controller and the antenna so that the controller can receive and transmit data via the antenna.

The lock mechanism comprises a latching mechanism which is operable between a first state which is a locked state and a second state which is an unlocked or open state. When the lock mechanism is in the locked state, the latching mechanism is in physical engagement with a latching port. When the lock mechanism is in the unlocked state, the latching mechanism is disengaged or released from the latching port.

The drive mechanism is configured to drive the lock mechanism to move between the locked state and the unlocked state and its operation is controlled by the controller.

The controller of the lock (or lock controller) is configured to send and receive instructions to the drive mechanism to operate the lock mechanism, to receive data, to process received data, to retrieve data, to transmit data, to send control signals to operate the drive mechanism, and to perform other control, communication and data processing functions without loss of generality.

The key interface is optional and is configured to interact with a physical key, for example a hard key of the present disclosure which is a physical key, and comprises a key portal which is a key interface port.

The controller comprises a solid-state microprocessor having built-in memory and peripheral circuitry. The memory comprises volatile memory and non-volatile memory and the controller may be realized as a control circuit comprising a microprocessor and peripheral circuitry and memory.

The power management circuit is configured to manage power supply for operation of the lock. Where the lock is a portable lock, the power management circuit comprises a portable power source such as a battery, in particular a rechargeable battery such as a lithium ion battery, a charging circuit for charging the power source, and optionally a battery charging port for connection with a charging power source. Where the lock is a fixture lock, the power supply may comprise a rectifier circuit for converting AC mains power to DC operation power. A fixture lock herein means the lock as mounted as a fixture and forms part of a fixture, such as part of a door or gate.

The power management circuit may comprise a power selector which is to select a power source from a plurality of available power sources. For example, the power selector may be configured to select an external power such as power from a hard key when the hard key is in keyed connection with the lock. The power selector may comprise a power switch which is operable by the controller to switch supply power to the lock mechanism between the power sources.

The main housing may be constructed of a robust and tamper resistant material and defines an internal compartment inside which components such as the electronic circuitry and power supply are housed.

The latching port is formed on or mounted inside the main housing and may have a rigid indented portion where the key interface is configured as a female connector.

A movable portion of the latching mechanism is hidden inside the main housing and a movable portion of the latching mechanism is exposable from the main housing. For example, the latching port is inside the main housing and a movable portion of the latching mechanism is exposed outside the main housing when in the locked state. The movable portion may retreat or advance towards the main housing to release physical engagement with the main housing when changing from the locked state to the unlocked state. The movable portion may comprise a pivoted hook in example embodiments of a portable lock and may comprise a latch in example embodiments of a fixture lock.

The lock controller is configured to receive instructions, to process received instructions and to perform operations according to the received instructions. The instructions are exchanged between the lock and a corresponding apparatus by way of data communication schemes through a data communication channel. The instructions are in the form of data messages and each data message is a command message (or message in short). Each message is a data string and the message is preferably an encrypted message to enhance security. Upon receipt of an encrypted command message or command messages, the controller is to operate to decrypt the message or messages and retrieve the embedded instructions. The AES 128-ECB encryption and decryption algorithms may be used as example encryption and decryption algorithm.

The command messages may have different properties or characteristics and are categorized according to the function or purpose of the message.

In example embodiments, the controller is configured to receive and process an example plurality of three categories of operation instructions, namely, a first category of user-oriented messages (or "user messages" in short), a second category of administration-oriented messages (or "admin messages" in short), and a third category which is a reset message for resetting the lock to factory settings.

For example, a user message has user message characteristic and is configured to deliver operation instructions such as "open lock", "close lock", etc. An admin message is configured to deliver administrative instructions such as setting operation parameters, operation settings, get log records or other data such as date and time information and battery status.

A user message may be encrypted with a user key (symbol: "USR_KEY") or an admin key (symbol: "ADM_KEY" or "admin key" in short"), and an admin message is encrypted with an admin key).

Each lock has a unique identity and no two locks are configured to have the same identity. The unique identity is intended to serve as a means of identification of the lock and may be built-in at the time of manufacturing. The unique identity may be in the form of an identification code for machine recognition of the identity of the lock. MAC (Media Access Control) of the lock, for example, the MAC address of the controller, may be conveniently used as an identification code of the lock.

An identification code of the lock may be imprinted on an outer surface of the lock or may be separated from the lock. The identification code may be presented in a machine-readable code such as a QR code, a bar code or other forms of digital codes. The identification code may be encrypted, for example, by encrypting a hashed MAC address using a softkey.

The lock is operable by a hard key or by a softkey. A softkey herein is an intangible key which is configured as a data string for operation of the lock, for example, to change a lock from a locked state to an unlocked state or to change from the unlocked to locked state. An example softkey herein is a data string having an example data sequence of an example plurality of 128 binary data bits. The softkey may be transmitted as a string of electrical data signals by the hard key or by an apparatus ("APP") pre-stored with a softkey and having a wireless data transmitter.

A hard key herein is a tangible key. The hard key comprises a lock interface for making physical contact or engagement with a corresponding key interface on the lock and comprises a lock interface port.

Figure 2A:
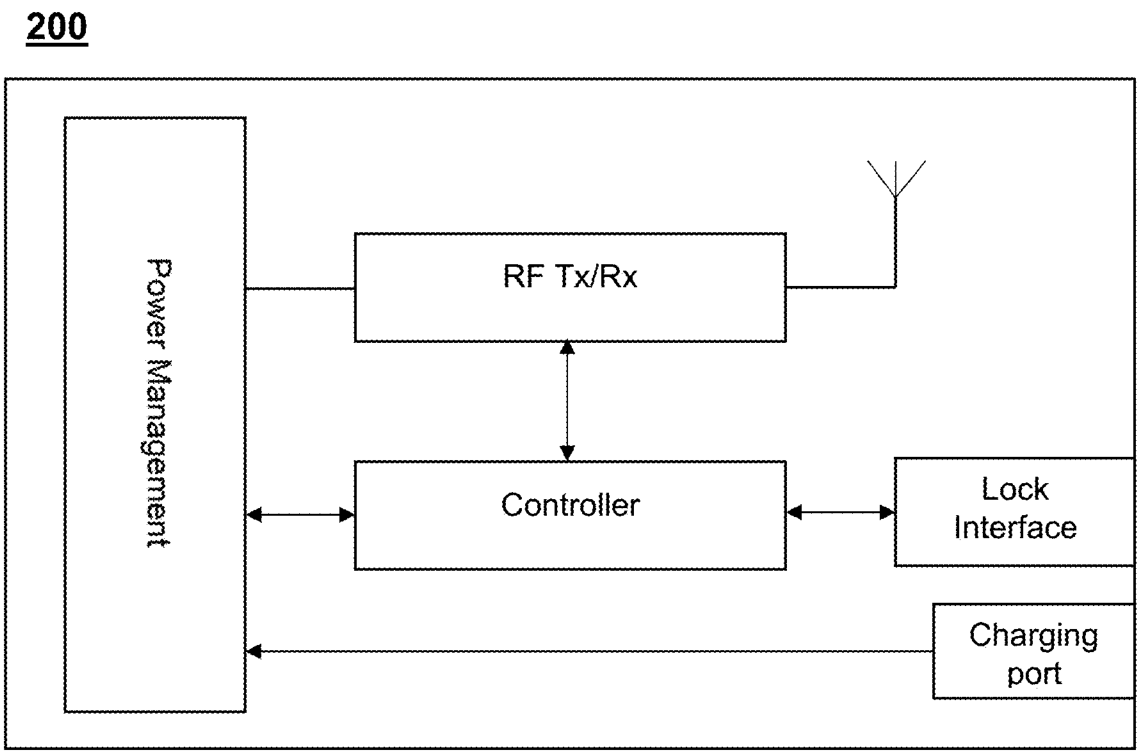

An example hard key 200 for operation with the lock comprises a controller, a wireless data communication frontend, a lock interface, a power source, a power management circuit and a main housing, as depicted in FIG. 2A.

The lock interface comprises a lock portal which is configured to physically interact with the key portal of the lock. The lock portal is configured to be physically compatible with the key portal of the lock. In example embodiments, the key portal and the lock portal are complementarily shaped. For example, the lock portal may have a first profile and the key may have a second profile which is physically complementary to the first profile. In example embodiments, the lock portal comprises a protrusion portion having a first physical profile and the key portal has a receptacle defining a compartment and having a second physical profile which is physically complementary to the first physical profile.

The wireless data communication frontend comprises a radio-frequency transceiver (TX/RX) and an antenna, and is configured for wireless transmission and wireless reception of data.

The radio-frequency transceiver electrically is connected intermediate the controller and the antenna so that the controller can receive data from the antenna and can transmit data from the antenna to the ambient.

The controller of the hard key (or key controller) is configured to send instructions to the lock, to receive data from the lock, to process received data, to retrieve data, and to perform other control, communication and data processing functions without loss of generality.

The controller comprises a solid-state microprocessor having built-in memory and peripheral circuitries. The memory may comprise volatile memory and non-volatile memory and the controller may be realized as a control circuit comprising a microprocessor and peripheral circuitries and memory.

The power management circuit is configured to manage operation power of the hard key and comprises a charging circuit for charging the power source. The charging circuit is connected to a battery charging port having a connection interface on the main housing for physical connection to a battery charging power source. In example embodiments such as the present, the battery charging port is adjacent to the lock interface and is in an optional form of a USB micro-B female connector. The power source of the key is also configured to supply power for operation of the lock in some circumstances, for example, when the lock when the key and the lock are in keyed physical connection. When a lock and a key are in keyed connection herein means when they are in complementary physical connection. The power source of the key may be a rechargeable battery, for example, a lithium battery comprising one battery cell or a plurality of battery cells, such as CR2032 button cells.

Each lock has a built-in softkey which is affixed or embedded in the lock at the time of manufacturing. In example embodiments, the softkey is flashed into the non-volatile memory or ROM of the lock. The built-in softkey is a unique key of the lock and is conveniently referred to herein as a Default Key.

Each lock has a hard key which is paired with the lock. The lock and the paired hard key, which is conveniently referred to as a Master Key herein, may be delivered to a purchaser at time of delivery or ex-factory.

A copy of the Default Key is saved on the Master Key. The Default Key may be affixed on the Master Key at time of manufacturing. For example, the Default Key may be flashed into the non-volatile memory or ROM of the key.

A copy of the Default Key is also stored on a secured host. The host may be a host server operating a host website to provide customer support or user support and has a database of locks, their characteristics and their Default Key. A copy of the Default Key may be downloaded from the host upon successful registration or upon satisfactorily meeting authentication requirements.

In example embodiments such as the present, the lock and the Master Key have no valid or useable User Key at the time of manufacturing or in the ex-factory state. In such embodiments, the User Key of the lock and the Master Key may be factory pre-set to an ex-factory default value such as nullity or INVALID. Likewise, the Default Key may be pre-set as the Admin Key in the ex-factory state. The default User Key and the default Admin Key may be replaced by a new User Key and a new Admin Key respectively when the lock is initialized.

For example, an initialization process is to be performed by a user when a lock is to be used for a first time by a user. To initialize the lock to operate, the user is to send an initialization request to the host server to request for activation of the lock. Upon receipt of the initialization request, the host server will send a set of softkeys to the owner in response. The set of softkeys may comprise a User Key and an Admin Key. Each one of the User Key and the Admin Key is a softkey. An example softkey herein is a coded data string formed by encryption of the Default Key, whether directly or indirectly. Upon receipt of the softkeys, the owner would then be able to operate the lock using the softkeys.

After the initialization process has been completed, the lock is ready for use by the user, who is in possession of the softkeys.

To operate the lock, a user will send an instruction to the lock. The lock on receipt of the instruction will respond to the instruction and perform the instruction accordingly.

An instruction may be a user instruction or an admin instruction. A user instruction is contained in a user message and an admin instruction is contained in an admin message.

A user message may be encrypted with a user key or the admin key while an admin message is encrypted by the admin key.

Upon receipt of the instruction, the lock will examine and determine whether the instruction carries a valid KEY, If the instruction carries a valid KEY, the instruction is taken as an authentic instruction and the lock will proceed to perform pre-defined operations according to the instruction.

Figure 3:
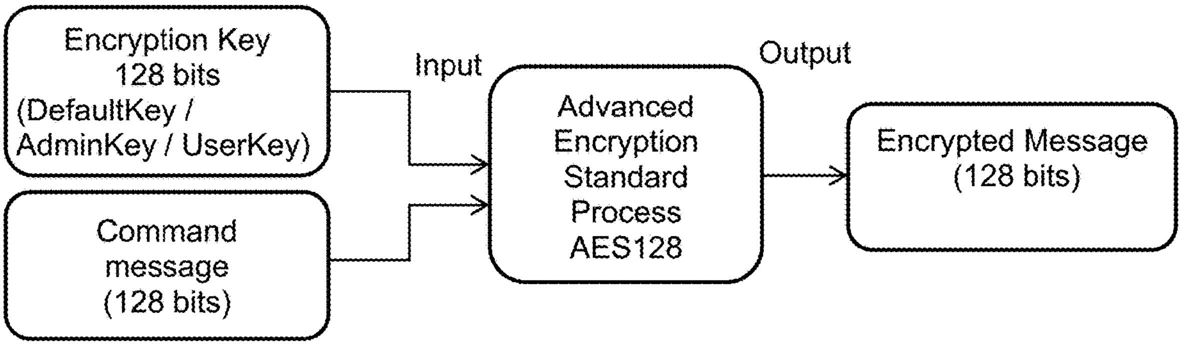
FIG. 3 is a schematic diagram showing an example encryption process of a command message.

An example message has four example message portions, namely, a first portion which is “Sequence number”, a second portion which is “Command”, a third portion which is “Data” and a fourth portion which is “CRC” (cyclic redundancy check). The example message has a 16-byte format and contains 128 binary data bits and is encrypted by a KEY to form an encrypted message, as shown schematically in FIG. 3.

In example set-ups, a user is to use a data communication apparatus such as a smart phone to download application software (“App”) from the host website. A data communication apparatus comprises a controller, a memory storage, a user-interface and a telecommunication frontend. The telecommunication frontend comprises a data communication frontend including a wireless data transceiver. The data communication apparatus may comprise a display such as a touch-panel screen. The example data communication apparatus may run on an operating system such as Android™ or iOS™.

After the App has been downloaded, the App is resident on the memory storage of the data communication apparatus as stored instructions and is ready for execution. The user may operate the data communication apparatus to execute the stored instructions to run the App and send an identification code of the lock to the host website to request for activation.

In example embodiments, the data communication apparatus comprises an image capture device such as a digital camera and the App incudes an image capture and process routine. To initiate a request for activation, a user is to activate the App on the data communication apparatus. Upon activation of the App, the data communication apparatus is to operate to execute stored instructions to capture an image of the identification code, to process the image, and to retrieve the identification code from the processed image.

In some embodiments, the identification code is in human-readable form and the data communication apparatus comprises a user interface for a user to input the identification code. Upon receipt of the human readable identification code, the data communication apparatus running the App will determine authenticity of the identification code.

The host server on examination of the request and the identification code accompanying the request would on execution of stored instructions determine whether the received code is a genuine identification code of the lock. If the received code is determined to be a genuine or authentic identification code of the lock, the host server will transmit the softkeys to the requesting apparatus or an electronic account designed by the request. In some embodiments, the host server will transmit a copy of the softkeys to a designated or registered account as an alternative or in addition. Where the lock has been activated before, signifying a new user replacing an old user, the host server will deactivate previous or old softkeys and notify the lock of the change in status of the softkeys by sending the lock a copy of the new softkeys. The lock is notified of the change of user or owner, for example, upon receipt of the new softkeys, and will update its records, including de-activation or obsolesce of the old softkeys.

A copy of the softkeys may be stored on the hard key, on a smart phone or on a data communication apparatus configured to operate as an electronic key of the lock on user's choice or preference.

Data communication between the data communication apparatus and the lock may be in two example forms of data packets.

A first example form is a Command Packet having the example format shown in Table 1:

TABLE 1

| Command Packet: | | | | |
|---|---|---|---|---|
| Offset | Field | Type | Size (byte) | Description |
| 0 | SEQ | BYTE | 2 | Sequence Number Starts with the next sequence number set in IDV/IDF command |
| 2 | CMD | BYTE | 1 | Command Code |
| 3 | DATA | ARRAY | 11 | 11 bytes of Command parameters. LSB first |
| " " | | | | |
| " " | | | | |
| 13 | | | | |
| 14 | CSM | BYTE | 2 | 16-bit checksum. Sum of byte 0 to byte 13. Low byte first. |

A second example form is a Response Packet having the example format of Table 2:

TABLE 2

| Response Packet: | | | | |
|---|---|---|---|---|
| Offset | Field | Type | Size (byte) | Description |
| 0 | RSEQ | BYTE | 2 | Sequence Number of the command packet to be response |
| 2 | RCM | BYTE | 1 | Response Command Code = Command Code |
| 3 | ERR | BYTE | 1 | Status of Command Execution. 0x00 -> success |

TABLE 2-continued

| Response Packet: | | | | |
|---|---|---|---|---|
| Offset | Field | Type | Size (byte) | Description |
| 4 | DATA | ARRAY | 10 | 10 bytes of response parameters. |
| " " | | | | |
| " " | | | | |
| 13 | | | | |
| 14 | CSM | BYTE | 1 | 16-bit checksum. Sum of byte 0 to byte 13. Low byte first. |

The lock is to send out a Response Packet upon receipt of a Command Packet.

The lock supports a plurality of services including, for example, device information, device service and other services. Each type of service has a universally unique identifier (UUID) plus a plurality of supported characteristics.

Device Information is configured to provide firm information of the lock. Firm information means data which are affixed or built in to the lock at manufacturing. The example Device Information Service uses a 16-bit UUID and includes a plurality of read only ("R") information of the lock. The example readable information may include identity of the manufacturer, the model number of the lock, lock serial number, and other useful information such as hardware version, firmware version and software version.

The lock (DEV) supports a plurality of services and example services and some characteristics are shown in Table 3 below.

TABLE 3

| Name | Data Direction | Property | Encryption | No. of bytes |
|---|---|---|---|---|
| Device Status | DEV → APP | R/N | NO | 2 |
| Reset Message | APP → DEV | WO/N | DEFAULT_KEY | 16 |
| User Message | APP → DEV | WO/N | USER_KEY | 16 |
| Admin Message | APP → DEV | WO/N | ADMIN_DEY | 16 |
| Device Configuration | APP → DEV | WO | None | 16 |

The lock status is read-only and is configured to inform the host machine (or "APP") the status of the lock, that is, whether the lock is in the locked state or in the unlocked or open state. The Lock Status has an example data length of one byte and has a binary value, for example, 1 or 0.

The Reset Message is an example Command Packet and is configured for resetting the lock to its ex-factory mode. When the lock is at its ex-factory mode, the lock is reset to its ex-factory settings. The Reset Message is a top-level control command requiring top-level security and is encrypted by the Default Key.

The User Message is an example Command Packet and is configured for operating the lock, for example, to change the lock from the locked state to the unlocked state and/or from the unlocked state to the locked state. The User Message is a user-level or operational-level control command which is encrypted by the User Key or the Admin Key. The User Key (USR_KEY) is set to an example value of INVALID at the ex-factory state or at the ex-factory mode and may have an example 16-byte hexadecimal value.

Example of Command Messages having admin message characteristics are set out in Table 4 below.

TABLE 4

| Instructions | Purpose |
|---|---|
| Set_timing | Set motor turning time FWD, REV |
| Get_timing | Get motor turning time FWD, REV |
| Set_admin_key | Set the Admin key into the lock |
| Set_User_Key | Set the User key into the lock |
| Get_User_Key | Get the User key from the lock |
| Set_RTC | APP to set real time clock of the lock |
| Get_RTC | Get the real time clock |
| Get_Lock_Record | Get the master key open lock record |
| Get_Total_Lock_Record | Get the number of record |
| Clr_Log | Clear the master key open log records |
| Identity_Verification | Perform an identity verification with the Lock, have to be first command sent that prevent other connection connect to the lock and not release. |

The Open_Lock command is configured to be transmitted by the APP. The command has the example command and response data formats as depicted in Table 9 below.

TABLE 5

OPEN_LOCK Command

| | | | |
|---|---|---|---|
| SEQ | 2 bytes | Sequence Number | KEY |
| CMD | 1 byte | 0x59 | ADMIN_KEY/USER_KEY |
| DATA | 4 bytes | = "APPO", if send through Admin Message Characteristic<br>= "USRO", if send through User Message Characteristic | |
| | 1 byte | = 'L' -> open the shackle lock<br>= 'D' -> open the door lock | |
| | 6 bytes | "OPENLK" | |
| CSM | 2 bytes | Check Sum | |

Response

| | | | |
|---|---|---|---|
| RSEQ | 2 bytes | Response Sequence Number | ADMIN_KEY/USER_KEY |
| RCM | 1 byte | 0x59 | |
| ERR | 1 byte | ERROR CODE | |
| DATA | 10 bytes | 0x00 | |
| CSM | 2 bytes | Check Sum | |

In response to the Command the lock controller will open the lock and sent a response to notify that the lock has opened.

The Open_Lock_Master_Key command is configured to be transmitted by the Master Key, and has an example format as shown in Table 6.

TABLE 6

OPEN_LOCK_MASTER_KEY Command

| | | | |
|---|---|---|---|
| SEQ | 2 bytes | Sequence Number | Key |
| CMD | 1 byte | 0x5A | USER_KEY |
| | 4 bytes | "KEYO" | |
| DATA | 1 byte | 'L' -> open the shackle lock<br>'D' -> open the door lock | |
| | 3 bytes | ID of the Master Key issuing this command<br>These 3 bytes will be the least significant 3 bytes of the Master Key's BT device address.<br>For example, the BT address of MASTER KEY is F4:04:4C:AA:BB:CC, then these 3 bytes will be {0xAA, 0xBB, 0xCC} | |
| | 3 bytes | "MAS" | |
| CSM | 2 bytes | Check Sum | |

Response

| | | | |
|---|---|---|---|
| RSEQ | 2 bytes | Response Sequence Number | USER_KEY |
| RCM | 1 byte | 0x5A | |
| ERR | 1 byte | ERROR CODE | |
| DATA | 10 bytes | 0x00 | |
| CSM | 2 bytes | Check Sum | |

After the lock has been opened by the Master Key issuing the Open_Lock_Master_Key command, the time of lock opening and the identity of the Master Key will be logged by the lock and the logged date will be saved on the lock and retrievable.

The Set_timing Command is an administrative command which is to set the motor forward (FWD) time, to set the motor reverse (REV) time, or the disable advertisement timeout value. The command has the example command and response data formats as shown in Table 7 below.

TABLE 7

SET_TIMING Command

| | | | |
|---|---|---|---|
| SEQ | 2 bytes | Sequence Number | Key |
| CMD | 1 byte | 0x40 | ADMIN_KEY |
| | 2 bytes (Little Endian Format) | Motor Forward time in mS Value from 100-2000 Other values are invalid | |
| | 2 bytes (Little Endian Format) | Motor Reverse time in mS Value from 100-2000 Other values are invalid | |
| DATA | 1 byte | Disable advertisement time in minutes, value ranges from 0x00-0xFF.<br>0x00 - always enable<br>Other values mean time to disable advertisement in minutes | |
| | 6 bytes | "SETTIM" | |
| CSM | 2 bytes | Check Sum | |

| | | | |
|---|---|---|---|
| RSEQ | 2 bytes | Response Sequence Number | ADMIN_KEY |
| RCM | 1 byte | 0x40 | |
| ERR | 1 byte | ERROR CODE | |
| DATA | 2 bytes (Little Endian Format) | Motor Forward time in mS Value from 100-5000 | |
| | 2 bytes (Little Endian Format) | Motor Reverse time in mS Value from 100-5000 | |
| | 1 byte | Disable advertisement time in minutes, value ranges from 0x00-0xFF.<br>0x00 - always enable<br>Other values mean time to disable advertisement in minutes | |

-continued

| | | |
|---|---|---|
| | 2 bytes (Little Endian Format) | Average Motor Driving Current in mA |
| | 3 bytes | 0x00 |
| CSM | 2 bytes | Check Sum |

The Get_timing Command is an administrative command which is to get the motor forward (FWD) time, to set the motor reverse (REV) time, or the disable advertisement timeout value.

The Reset_Seq_Num Command is both an administrative command and a user command which is to re-initialize the sequence number and has an example format as shown in Table 8 below.

TABLE 8

RESET_SEQ-NUM Command

| | | | |
|---|---|---|---|
| SEQ | 2 bytes | Sequence Number | Key |
| CMD | 1 byte | 0x42 | ADMIN_KEY |
| DATA | 7 bytes | "RST_SEQ" | |
| | 2 bytes | New Sequence Number 0xnnnn | |
| | 2 bytes | Inverted New Sequence Number −0xnnnn | |
| CSM | 2 bytes | Check Sum | |

Response

| | | | |
|---|---|---|---|
| RSEQ | 2 bytes | Response Sequence Number | ADMIN_KEY |
| RCM | 1 byte | 0x42 | |
| ERR | 1 byte | ERROR CODE | |
| DATA | 10 bytes | 0x00 | |
| CSM | 1 byte | Check Sum | |

The Set_Admin_Key Command is an administrative command which is to be used by the APP to set the Admin Key. The Admin Key is an important encryption key for encryption of admin messages and has an example data length of 16 bytes. The example process of setting a new Admin Key is divided into an example plurality of three phases. In the first phase, the APP is to send a first portion of the new Admin Key to the lock. The APP is to send a second portion of the new Admin Key to the lock upon receipt of a response message from the lock signifying that the first portion of the Admin Key has been received. Upon receipt of a response message from the lock signifying that the second portion of the new Admin Key has been received, the APP will then send a Set_Key_Finish to the lock to signify completion of new Admin Key setting. During the new Admin Key setting the old or existing Admin Key will be used for data encryption and decryption.

The lower 8 bytes of the new Admin Key are to be sent to the lock in the first phase, the upper 8 bytes of the new Admin Key are to be sent to the lock in the second phase after the lock has responded with an acknowledgement message, and a SETADMOK message is sent by the APP in the third phase. After the new Admin Key has been set, the new Admin Key will be used for subsequently until another new Admin Key is set.

The Set_User_Key Command is an administrative command which is to be used by the APP to set the User Key. The User Key is an important encryption key for encryption of User messages and has an example data length of 16 bytes. The example process of setting a new User Key is divided into an example plurality of three phases. In the first phase, the APP is to send a first portion of the new User Key to the lock. The APP is to send a second portion of the new User Key to the lock upon receipt of a response message from the lock signifying that the first portion of the User Key has been received. Upon receipt of a response message from the lock signifying that the second portion of the new User Key has been received, the APP will then send a Set_Key_Finnish to the lock to signify completion of new User Key setting. During the new User Key setting the old or existing Admin Key will be used for data encryption and decryption. The command has the example command and response data formats as depicted in Table 10 below.

TABLE 9

SET_USER_KEY Command

| | | | |
|---|---|---|---|
| SEQ | 2 bytes | Sequence Number | Key |
| CMD | 1 byte | 0x33 | ADMIN_KEY |
| DATA | 2 bytes | "UK" | |
| | 1 byte | KEY_PHASE<br>"1" - lower 8-bytes of new key<br>"2" - upper 8-bytes of new key<br>"9" - SET_KEY_FINISH<br>Others - invalid | |
| | 8 bytes | If KEY_PHASE = 0x31 ("1")<br>Lower 8 bytes of key<br>If KEY_PHASE = 0x32 ("2")<br>Upper 8 bytes of key<br>If KEY_PHASE = 0x39 ("9"),<br>Must set to "SETUSROK" | |
| CSM | 2 bytes | Check Sum | |

| | | | |
|---|---|---|---|
| RSEQ | 2 bytes | Response Sequence Number | ADMIN_KEY |
| RCM | 1 byte | 0x33 | |
| ERR | 1 byte | ERROR CODE | |
| DATA | 10 bytes | 0x00 | |
| CSM | 2 bytes | Check Sum | |

In the example as shown in Table 9, the lower 8 bytes of the new User Key are to be sent to the lock in the first phase, the upper 8 bytes of the new User Key are to be sent to the lock in the second phase after the lock has responded with an acknowledgement message, and a SETUSROK message is sent by the APP in the third phase. After the new Admin Key has been set, the new Admin Key will be used subsequently until another new Admin Key is set.

The Get_User_Key Command is an administrative command which is to be used by the APP to get the User Key from the lock.

Figure 4A:
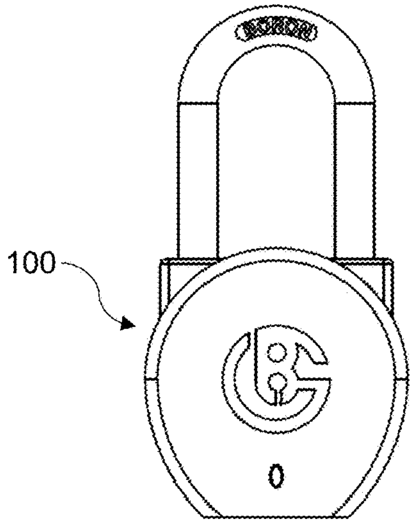
FIG. 4A is a front view of an example lock.
Figure 5A:
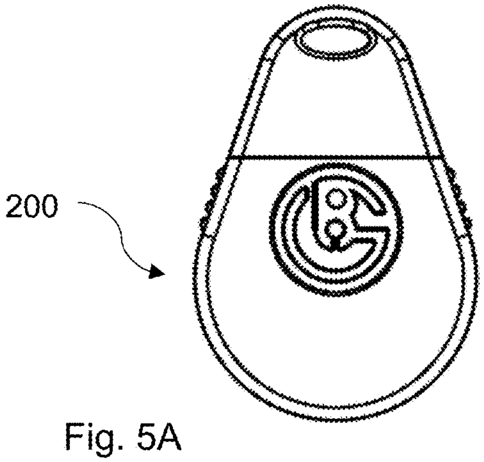
FIG. 5D is an exposed view of the example key of FIG. 5A.
Figure 5B:
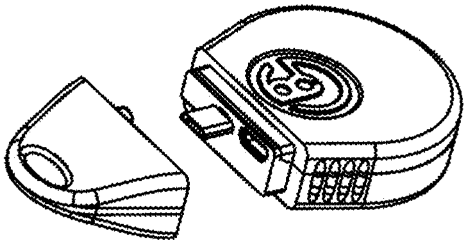
Figure 5C:
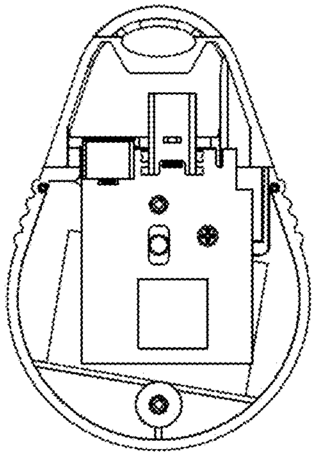
Figure 5D:
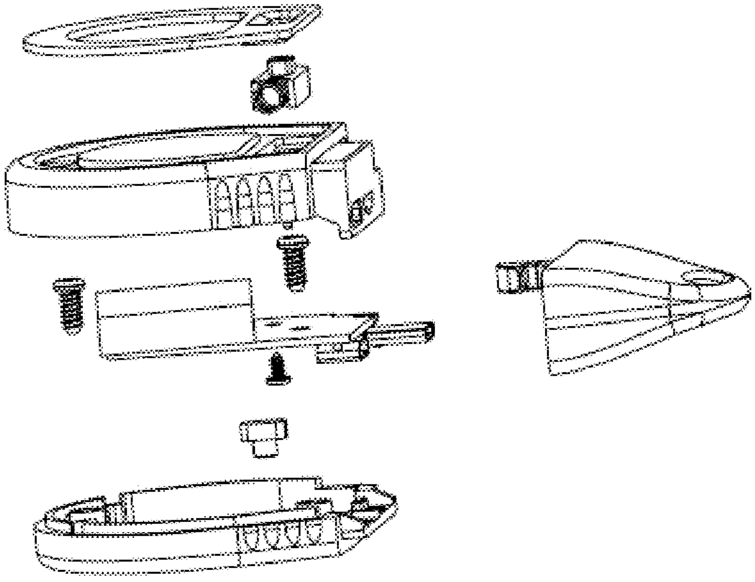
Figure 6:
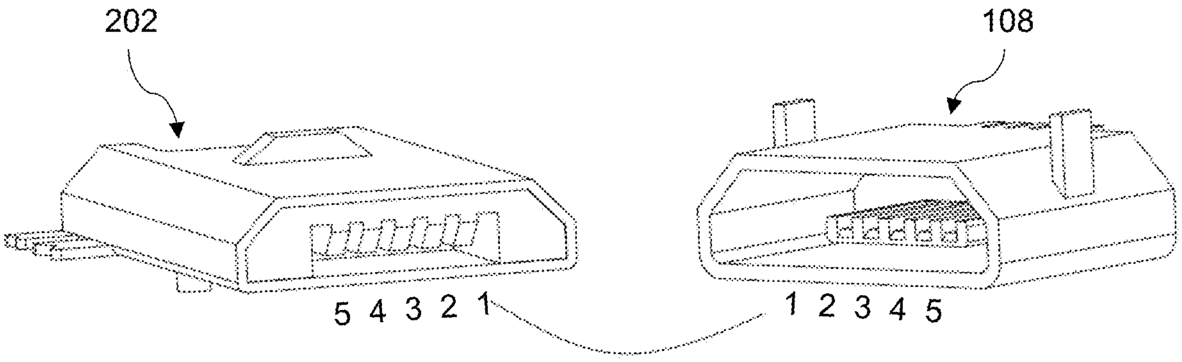
FIG. 6 shows interface ports of the example lock of FIG. 4A and the example key of FIG. 5A, FIGS. 7A and 7B are cross-sectional views showing the example lock and key of FIGS. 4A and 5B in mechanically coupled engagement in a latching position and a releasing position respectively.

An example physical lock 100 which is implemented in the form of a padlock is shown in FIG. 4A. An example hard key which is paired with the lock at the time of manufacturing is shown in FIG. 5A. A hard key which is paired with a lock at manufacturing is a master key ("Master Key") herein.

The lock 100 comprises a main housing which is a hard and robust metal casing inside which a drive mechanism, a portion of the lock mechanism, a controller, a wireless data communication frontend, a key interface and a power management circuit are housed. The lock mechanism comprises a lock arm which is movable between a locking position and an unlocking position. The lock arm comprises a first portion which is permanently received inside the metal housing and which is pivotally movable relative to the main housing and about its axis. The first portion of the lock arm is an axial portion which is movable along an axial direction of its axis between a locking position and an unlocking position. The first portion has a first recess and is under spring urge to move along its axial direction and away from the locking position towards the unlocking position.

The second portion is an axial portion which is offset from the first portion and which is pivotally movable relative to the main housing and pivotally movable about the axis of the first portion as a pivotal axis. The second portion is also movable in a direction parallel to its pivotal axis between a locking position and an unlocking position and has a second recess. The second recess is inside the main housing when in the locking position and outside the main housing when in the unlocking position.

The lock mechanism comprises a latching member which is movable between a latching position and a releasing portion.

When the lock arm is in the locking position and the latching member is in the latching position, the lock is in the locked state and the lock arm is locked at its locking position.

When the latching member is in the releasing position, the lock is moved into the unlocked state and the lock arm is moved into its unlocking position by the spring urge acting on the first portion of the lock arm.

Figure 4B:
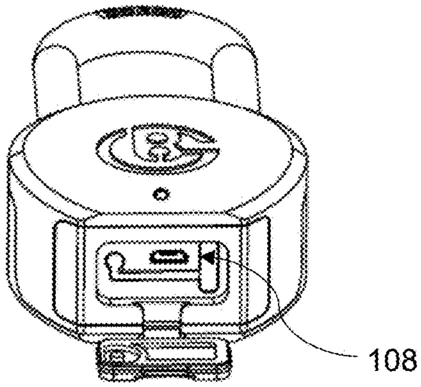
FIG. 4B is a perspective view showing an USB port of the example lock of FIG. 4A.
Figure 4C:
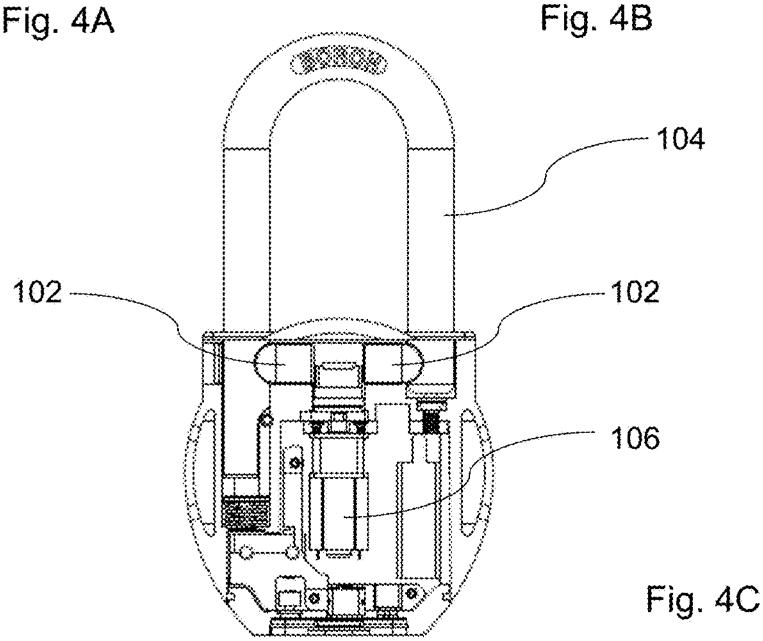
FIG. 4C is a cross-sectional view of the example lock of FIG. 4A, FIGS. 5A, 5B and 5C are front, perspective and cross-sectional views of an example hard key.

Referring to FIGS. 4A-4C, the latching member comprises a pair of bullet heads 102. The bullet heads 102 are in complementary engagement with the recesses on the lock arm 104 when the lock is in its locked state. The bullet heads are opposite end portions of a latching device and are on opposite diametric ends of the motor shaft 106. The bullet heads projects from opposite diametric sides of the motor shaft and the latching device extends in a transverse direction orthogonal to the motor axis. The transversal extent of the bullet heads, measured from free-end to free-end, is comparable to the clearance between the recesses of the lock arm.

Figure 7A:
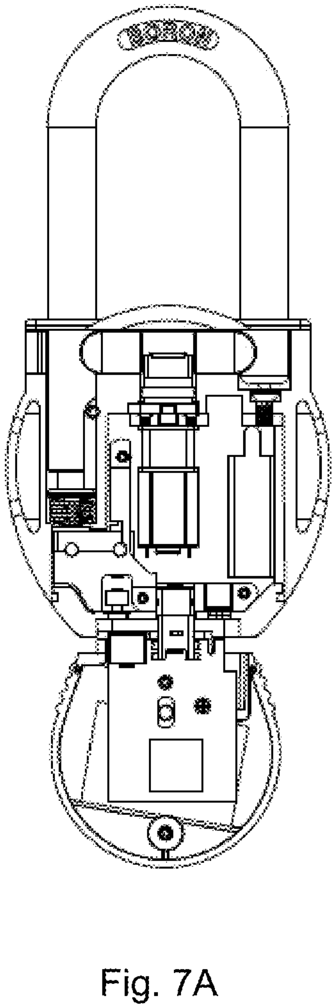
Figure 7B:
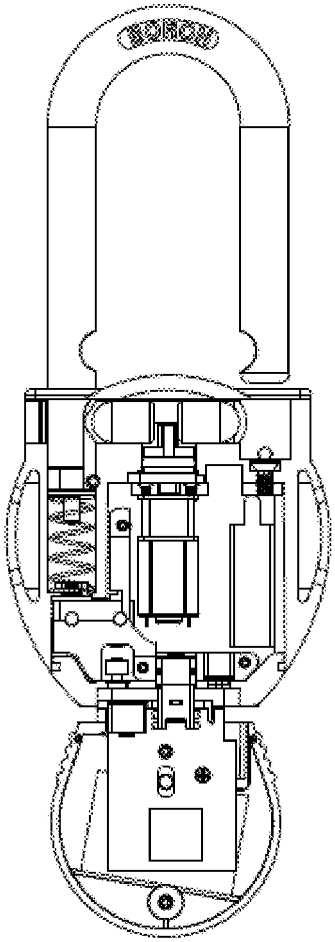
Figure 8:
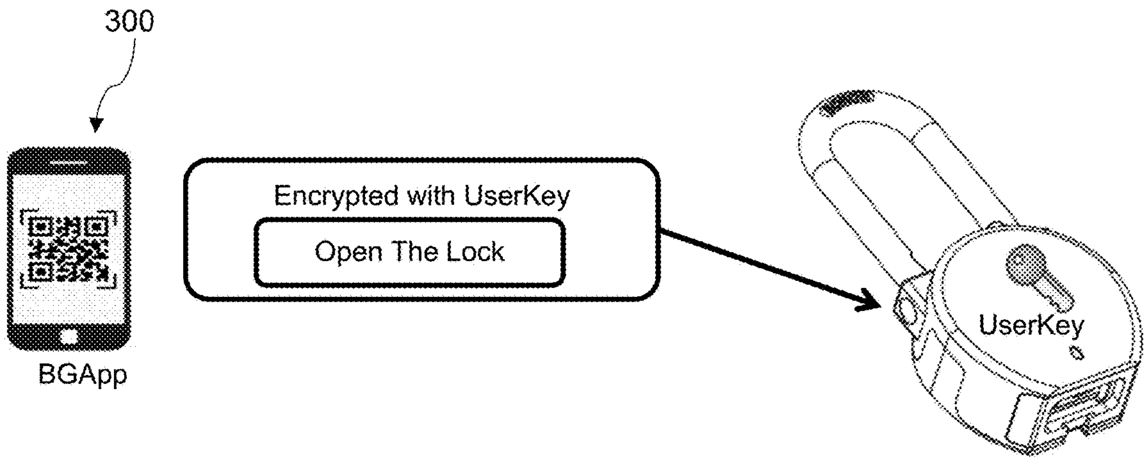
FIG. 8 shows, schematically, remote operation of the example lock of FIG. 4A by a data communication apparatus.
Figure 9:
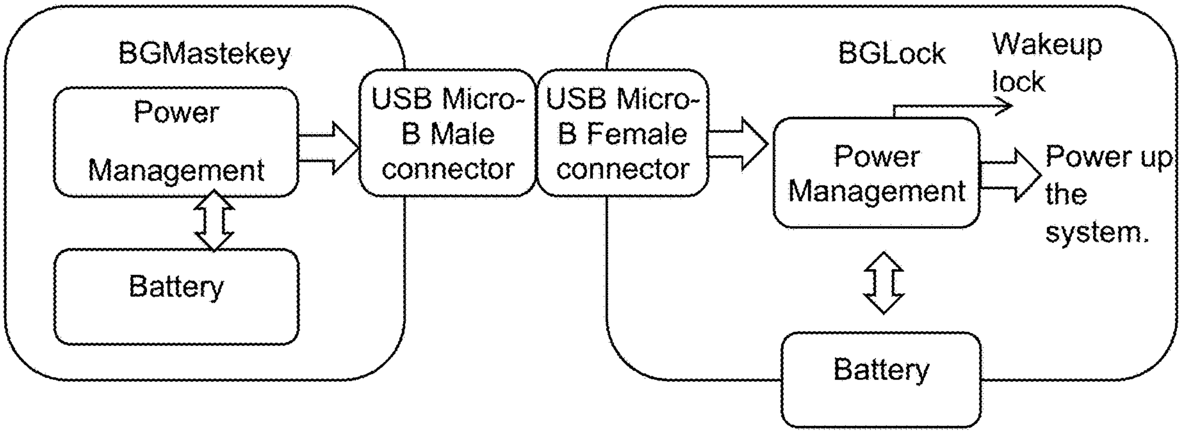
FIG. 9 shows, schematically, contact operation of the example lock of FIG. 4A by a hard key in mated engagement with the lock.
Figure 10:
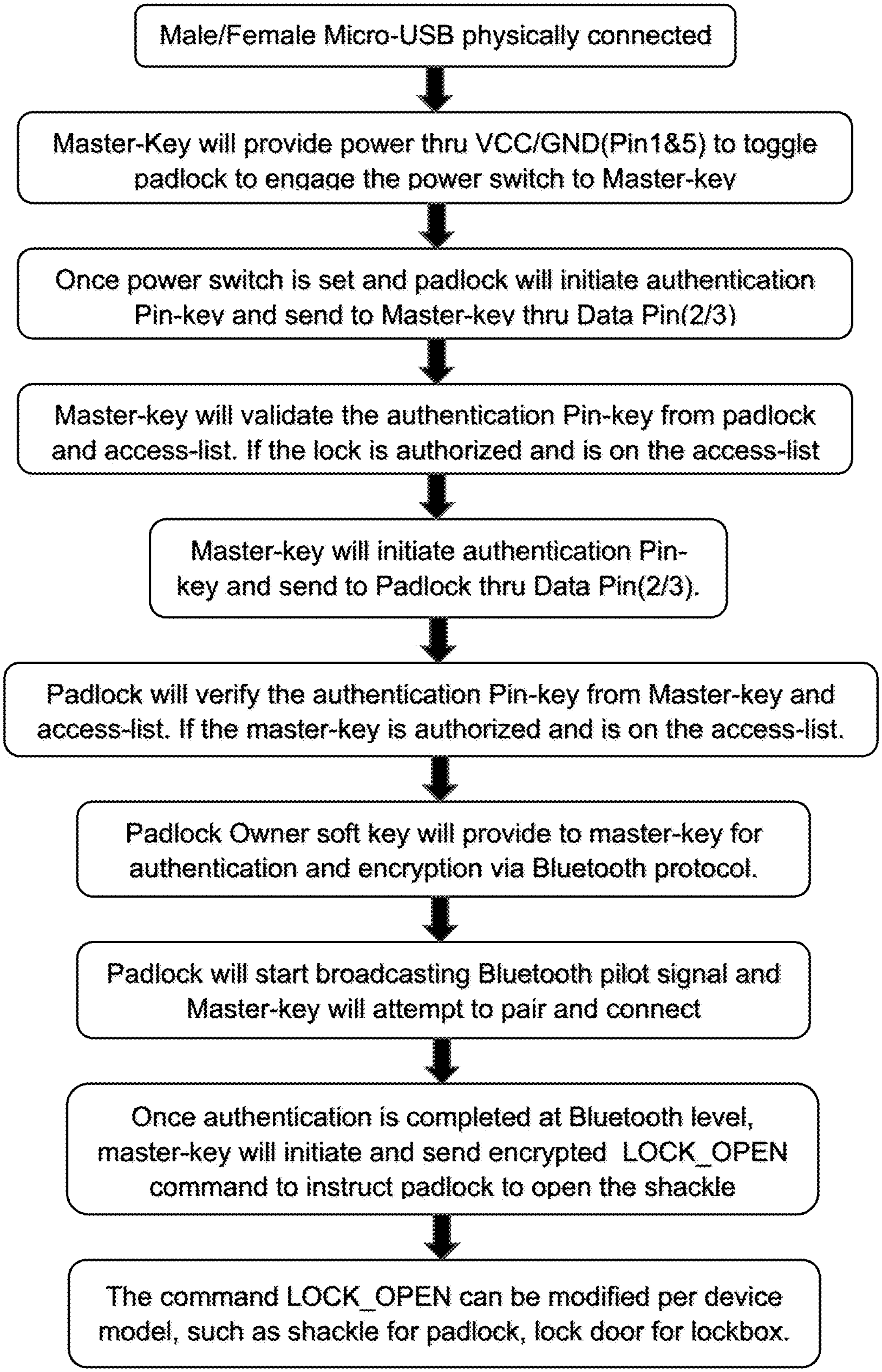
FIG. 10 shows a flow chart of the operation of the example lock of FIG. 4A by a hard key in mated engagement with the lock.

The latching device is driven by a drive mechanism to move between a latching position and a releasing position as shown in FIGS. 7A and 7B respectively. The drive mechanism comprises a motor 106 having a motor shaft which is rotatable about a motor axis and a motor driving circuit. The motor may be a brushless DC motor and the motor driving circuit may comprise a driving bridge for driving the motor.

The motor is electrically connected to the motor driving circuit which is controlled by the controller. The controller is configured to operate the drive mechanism to drive the motor to rotate the latching member between the latching position and the releasing position.

A Toshiba TC35680, which is a Bluetooth Low Energy (5) single-chip controller with built-In flash ROM, is used as an example controller. The wireless transceiver to facilitate Bluetooth (BT) data communication is on-board the controller so that no separate wireless data communication frontend if required for enhanced compactness and cost efficiency. The lock arm is configured as an antenna for wireless signal reception and transmission. The controller and the motor driving circuit are mounted on a printed circuit board ("PCB"). The example PCB is mounted on a side of the motor for compactness.

The example lock requires user activation in order to commence operational service for the first time after factory delivery. In example embodiments, the example lock at its ex-factory state has its User Key set to Invalid and its Default Key set as Admin Key. To activate the lock, a first owner of the lock is required to initialize the lock by engaging into data communication with the host server and to register ownership with the host server. In example embodiments, an owner may operate a mobile data communication apparatus such as a smart phone to capture an image of an encrypted identification code and send the captured image of the scanned encrypted identification code to the host server. The host server upon verification of the authenticity of the identification code is to send the softkeys to the user and the lock is then ready for use. The encrypted identification code may be formed by encryption of a hashed MAC address of the lock by the Default Key of the lock. After the user is in possession of the softkeys, the user may save the softkeys and the identification code of the lock on the Master Key, the Smart phone or other data communication apparatus ("APP") for subsequent use. A plurality of User Keys of a plurality of locks may be stored on a single data communication apparatus and the user may execute stored instructions to operate the lock. A lock may be assigned a nickname by a user for ease of recognition and use. A nickname can be for example, garage door, bicycle 1, etc. without loss of generality. The APP may have lock information including identification code and or nickname of the locks, their respective softkeys and their respective statuses arranged in the form of a lock table.

The softkeys saved on the APP may include User-Keys and/or Admin-Keys. For example, a user may be granted right to open and/or close a lock in which case the user is only given a copy of the User-key, but not a copy of the Admin-Key. Where the APP is a Master Key paired with, say lock 1 (Garage), the APP will have both UserKey and AdminKey. Likewise, an APP may be an administrator given with administration right only, in which case the APP of the administrator may be given a copy of the AdminKey only (and not the UseKey). The status "Registered" means the hardware identification of the hard key has been registered with the specific lock and "Unregistered" means the hardware identification of the hard key has not be registered with the specific lock.

In example operations, the user is to activate the dedicated application software (App) on the data communication apparatus 300 to operate the lock. The data communication apparatus on executing the App will become an APP (or hard key) which is operable to transmit the softkeys to operate the lock. Initially, the APP will commence wireless scanning to make inquiries to locate the lock. The lock in response will transmit its identification code, which in this example is its MAC address, by wireless data communication in Bluetooth LE ("BTLE") protocol. The APP upon receipt of the identification code via BTLE transmission will look up its storage and determine whether the lock is one which is operable by the stored softkeys and to pair with the lock. The APP can then operate the lock using the App and the commands of the App.

In example operations, a user may operate the lock with the Master Key in physical contact with the lock.

Referring to FIG. 4B, the example lock has a USB port 108 on its main housing and the Master Key has a compatible and complementary USB portion on its main housing such that the USB port on the lock and the counterpart USB port on the Master Key can enter into mated engagement. In this example, the key interface port of the lock has the form and configuration of a USB Micro-B female connector and the lock interface port of the Key has the form and configuration of a USB Micro-B male connector which can enter into mated physical engagement with the key interface of the lock.

The example lock interface port 202 of the key 200 comprises an example plurality of 5 key interface terminals (or pins) and the pins have same description as the terminals of the USB connector herein.

The example lock is configured to monitor status at the identification terminal of the key interface. When the status at the identification terminal signifies that a hard key compatible with the lock is present, the lock is to commence data communication and data communication will take place through the data communication terminals, namely terminals 2 and 3.

In example embodiments, a signature identification voltage present at the identification terminal will wake up the lock. When the lock is woken up by the signature identification voltage, the lock will proceed to commence data communications through the key interface terminals.

In example embodiments such as the present, data communications which are to take place through the key interface are wired data transmission, for example, in serial form by means of a serial port protocol.

In example embodiments, the data exchange which is to take place through the key interface is confined to non-secured data such as device identification data, for example, the MAC address or the serial number of the lock and the hard key.

When identification data of the lock are received by the hard key, the hard key will look up its lock table and determine whether the lock is an eligible lock for the hard key. An eligible lock is one that is on the lock table of the hard key.

If the lock is on the lock table of the hard key, which means that the lock is ready to be operable by the hard key, the hard key will switch to wireless data communication with the lock. In example embodiments such as the present, the wireless data communication is facilitated using BTLE protocols since both the lock and the hard key is Bluetooth enabled. In some embodiments, the lock and the hard key may be configured to facilitate data communication using other wireless data communication protocols without loss of generality. If the lock is not on the lock table, the hard key will turn off its power output to preserve power.

After the lock has sent out its device identification data, the lock is to switch into a discoverable mode to be discoverable and the hard key is to perform scanning and search for a matched Bluetooth device having the device identification data for Bluetooth pairing. Once the lock is found by the hard key, the hard key will initiate a connection request, for example, via standard Bluetooth "Just-Works" model to establish Bluetooth data connection.

After the lock and the hard key have established wireless data connection, the hard key will look up its lock table to check whether the hard key has operated the lock before. If the hard key had operated the lock before, the lock would have a "Registered" status assigned on the lock table. Otherwise, the lock would not have a "Registered" status and may have, for example, a "Not-Yet-Registered" status. If the lock does not have a status of "Registered", signifying that the hard key has not previously operated, for example, open or close, the lock, the hard key is to send an instruction to request the lock to add or include the hard key as an eligible hard key, and the instruction may include the device identification data of the hard key. The instruction may have a command name of "Add_Master-Key".

After the lock has received and accepted the "Add_Master-Key" command, the hard key #6 having the example MAC address is admitted as an eligible hard key for operation of the lock, and the lock will update its key table.

After the acceptance and table update have been complete, the newly admitted hard key will be entered on the key table of the lock and assigned a "Valid" status, and the lock will send an acknowledge to the hard key. A "Valid" status means the hard key has passed the admittance procedure to be operable. When the hard key is on the key table and assigned a "Valid" status, the admitted hard key may create and send operational commands to the lock, for example, the Lock_Open command to open the lock.

On the other hand, if the lock is on the lock table and has a "Registered" status, this means the hard key had previously registered with the lock and the lock has a record of the identification code of the hard key on its key table, the lock will communicate with the hard key and take operational commands from the hard key, subject to authenticity check of the operational commands.

In some embodiments, the hard key may be configured to verify its status with the lock even though the lock is on the lock table and has a "Registered" status, since the "Registered" status may have become obsolete due to intervening events, such as intervening registration of a new owner or intervening disabling of the hard key.

In example embodiments, the hard key may be configured to send a command to request for a verification of its status vis-a-vis the lock. The command may have code-named "Key_valid_Check_Request".

In response, the lock will send a Key_valid_Check_Response.

If the return value of the Key_valid_Check_Response signifies that the hard key is valid, the hard key may send an operational command such as a Lock_Open_Request to open the lock.

Upon receipt of a command such as an encrypted Lock_Open_Request message, the lock is to decrypt the message using the UserKey of the hard key which sends the command to extract the embedded command. If the decryption is successful, the lock shall proceed to perform the operation stipulated by the command.

In example embodiments, the controller of the lock is configured to switch the operation power supply of the lock from the built-in power source to the hard key. In such embodiments, the controller comprises a power switching circuit. The power switching circuit may be controlled by the controller or a built-in power control circuit.

For example, when a signature voltage signifying the insertion of a hard key is detected at the key interface of the lock, the controller or the power switching circuit will recognize the signature voltage as an identification signal of a hard key and operate to change power supply so that the operation power of the lock is provided by the hard key, instead of the internal power supply of the lock to preserve power of the lock to extends its time before charging. An example hard key may have buttons pre-set on the main housing for operating the lock. The preset buttons may include a "lock" button, an "unlock" button, and/or other functional buttons without loss of generality. A button herein may be a mechanical button or an electronic button such as a sensing tab on a panel.

A hard key may operate a lock remotely, that is, without physical contact between the lock and the hard key, for example using BTLE protocol. For example, a Mastery Key may operate its default lock remotely without having the lock interface and the key interface in mated engagement. In example embodiments, a Master Key may have a default button or default buttons assigned for remote operation of the default lock. A default lock ("Default Lock") herein is a lock which is paired with the Master Key at the time of manufacturing or at the time of delivery. For example, if there is only one lock which is stored or registered on the hard key and/or is in an activated or valid status, the key controller on detection of operation signal at the preset button will commence wireless data communication with the controller of that lock and to perform operations according to the command instructions. For example, when the Default Lock is the only lock which is stored or registered on the Master Key, pressing a preset button on the Master Key will lead to operation of the Default Lock. In example embodiments, the controller upon detection of operation signal of a preset button will determine whether there is only one operable lock stored on the hard key and to proceed to operation of the operable lock if it is determined that there is only one operable lock.

The softkeys and hard keys which are in force may be updated from time to time remotely.

For example, if a hard key is reported loss, the APP may execute stored instructions such as a remove key or disable key command and the lock upon receipt of the instructions will remove or disable the keys.

Alternatively, or in addition, the APP may execute stored instructions to change the UserKey and the AdminKey and notify the lock to update the changes. As a result, obsolete keys having obsolete UserKey and AdminKey will no longer pass the decryption procedure.

Figure 11:
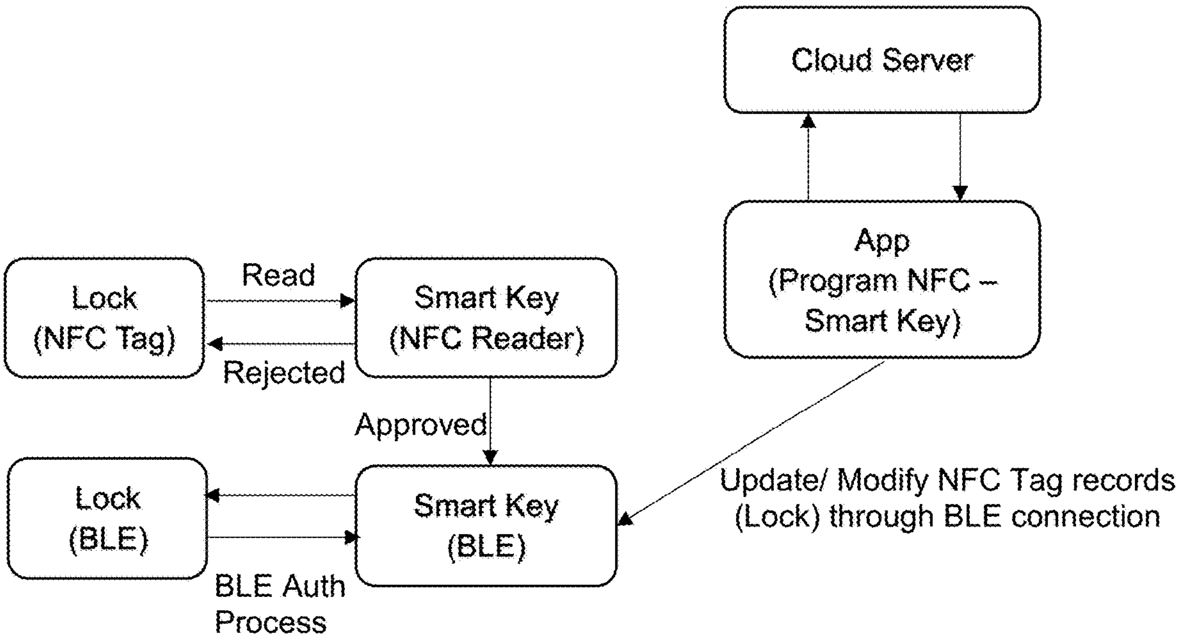
FIG. 11 shows, schematically, contactless operation of the example lock.
Figure 12A:
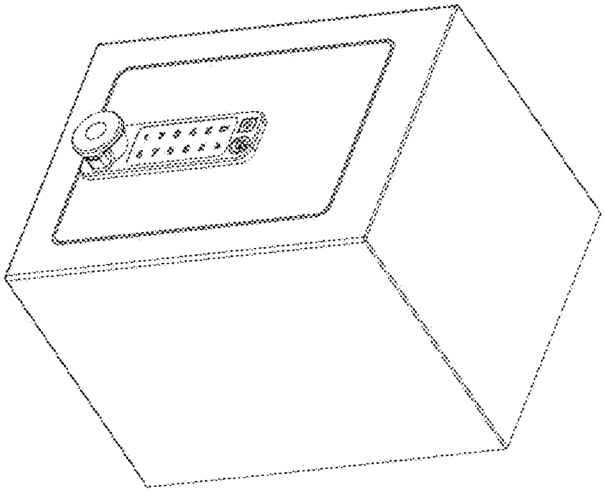
FIGS. 12A, 12B, 13A and 13B show example safebox and lockbox forms of lock according to the disclosure.
Figure 12B:
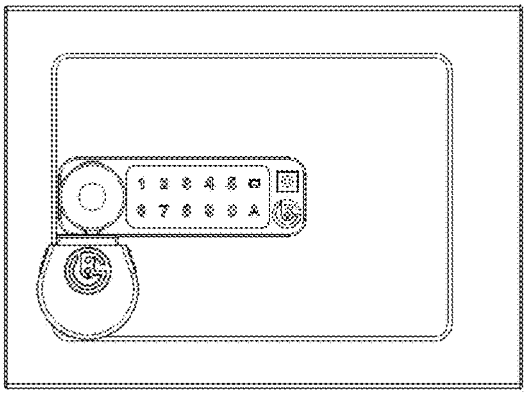
Figure 13A:
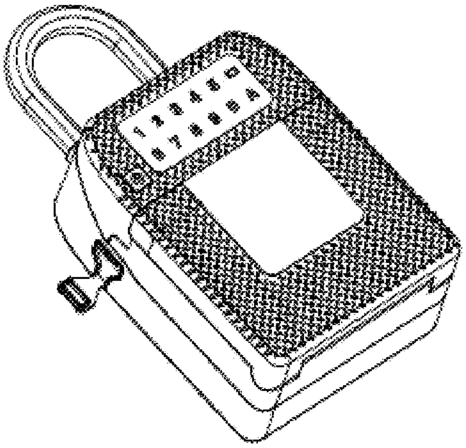
Figure 13B:
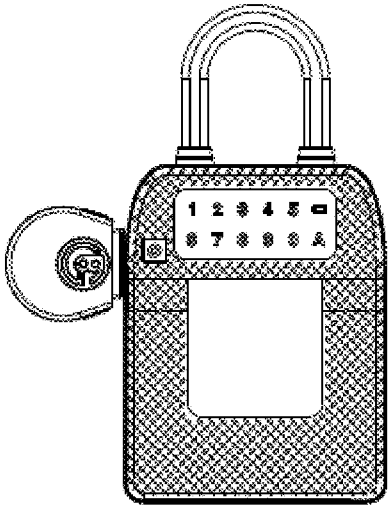
Figure 14A:
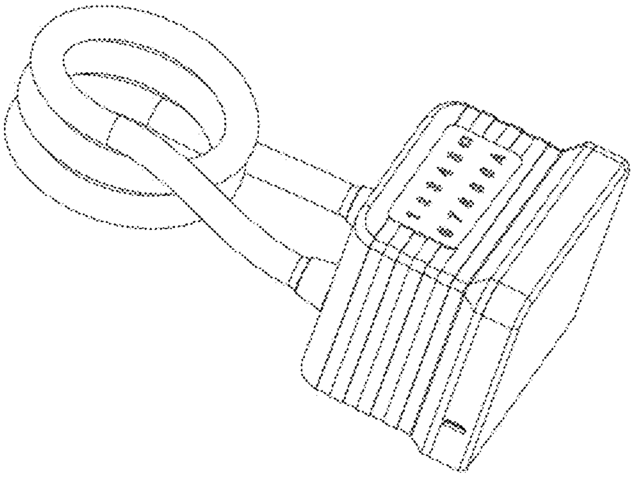
FIGS. 14A, 14B, 15A and 15B show example cable lock and door lock forms of lock according to the disclosure.
Figure 14B:
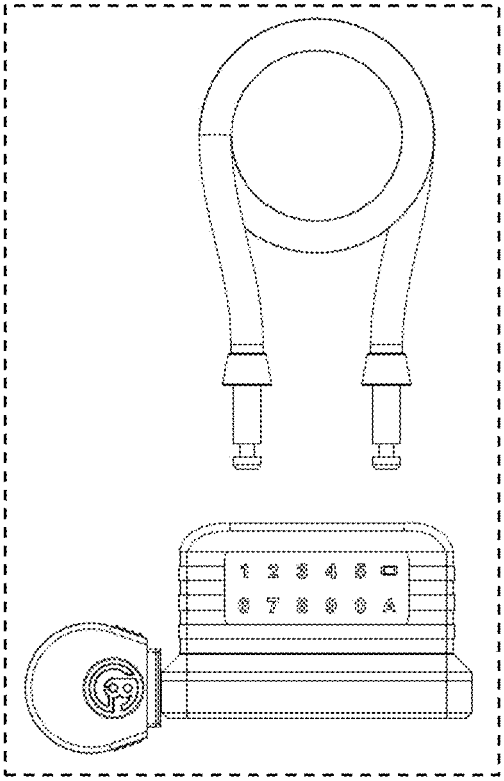
Figure 15A:
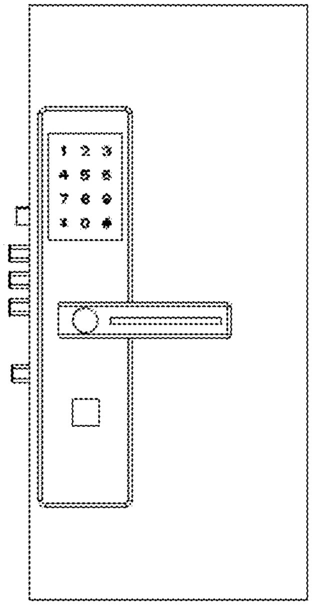
Figure 15B:
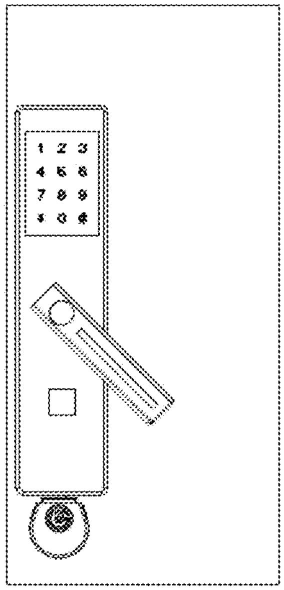

In example embodiments, the authentication of device identification data is implemented via contactless method, for example, near field communication (NFC). Referring to FIG. 11, the example electronic lock is a NFC tag and the example electronic key is a NFC reader. The NFC tag is a passive device, which means that it operates without a power supply of its own in the authentication stage. It enters into sleep mode if no activity is detected for a predetermined period of time, thereby power is preserved. Connectivity and authentication is initiated when the key is place in proximity to the lock.

While the present disclosure has been made with reference to example and embodiments, the example and embodiments are non-limiting and are not intended to limit the scope of disclosure.

For example, the lock may be implemented as a lock of a smart safe box, a door lock or in other forms as shown in FIGS. 12A-15B. The terms UserKey and User Key are used interchangeably and the terms AdminKey an Admin Key are used interchangeably.

The invention claimed is:

1. A lock comprising a controller, a data storage device, a lock mechanism operable by the controller in a locked state or an unlocked state, and a data communication frontend comprising a first data port and a second data port;

wherein the controller is configured to enter into data communication via the second data port after successful completion of data communication via the first data port;

wherein the controller is configured to receive identification data via the first data port and to receive operational data messages via the second data port.

2. The lock according to claim 1, wherein the controller is configured to not to receive operational data messages via the second data port if the identification data received via the first data port does not meet an admission criterion; and/or wherein the controller is configured to conduct unencrypted data communication via the first data port and encrypted data communication via the second data port.

3. The lock according to claim 1, wherein the first data port is a data port configured for wired data communication or wireless data communication and the second data port is a data port configured for wireless data communication.

4. The lock according to claim 1, wherein the first data port is configured for wireless data communication at a first modulation frequency or baseband binary data communication and the second data port is configured for wireless data communication at a second modulation frequency.

5. The lock according to claim 1, wherein the first data port is configured for near-field data communication and the second data port is configured for non-near-field data communication.

6. The lock according to claim 1, wherein a code is prestored in the lock and the controller is configured to respond by transmitting the code upon detection of the code coming in from the first data port.

7. The lock according to claim 6, wherein the code comprises a unique identification code of the lock and the controller is configured to respond by transmitting the code via the first data port.

8. The lock according to claim 1, wherein a first encryption key which is built-in encryption key is permanently stored on the lock and the controller is configured to use a second encryption key to retrieve lock operation instructions include locking and unlocking instructions, and wherein the controller is configured to retrieve the second encryption key using the built-in encryption key.

9. The lock according to claim 8, wherein the second encryption key is embedded in a data message received via the second data port, and the data message is encrypted using the built-in encryption key which is a default encryption key.

10. The lock according to claim 1, wherein the lock comprises a third port and the controller is configured to detect and measure a compatibility signal at the third port, and wherein the controller is configured to commence data communication via the first data port if the compatibility signal meets an admission criterion which is a first admission criterion, and not to engage in data communication via the first data port if the compatibility signal at the third port does not meet the first admission criterion.

11. The lock according to claim 10, wherein the compatibility signal is a DC signal having a DC voltage, and the controller is configured to proceed to engage in data communication via the first data port if the DC voltage at the third port is at a specific voltage level or within a specific voltage range; and/or wherein the controller is configured to proceed to engage in data communication via the first data port if the DC voltage at the third port is above the specific voltage level or not within the specific voltage range; and/or wherein the controller is configured to cease data communication via the first data port and/or the second data port when the compatibility signal ceases to meet the first admission criterion.

12. The lock according to claim 10, wherein the lock comprises a key interface for mated reception of a physical key, and wherein the key interface comprises the first data port and the third data port.

13. The lock according to claim 12, wherein the lock comprises a power management arrangement and the controller is configured to operate the power management arrangement to switch to receive lock mechanism operation power from the physical key when the physical key is physical and electrical connection with the key interface.

14. The lock according to claim 1, wherein the controller is configured to perform wired data communication via the first data port to determine admissibility and to switch to wireless data communication via the second data port if positive admissibility is determined during the wired data communication.

15. An electronic key comprising a key controller, a data storage device, a power source and a data communication frontend comprising a first data port and a second data port; wherein the electronic key is a physical key having a key body and is configured to work with a lock; wherein the lock comprises a lock controller, a data storage device, a lock mechanism operable by the lock controller in a locked state or an unlocked state, and a data communication frontend comprising a first data port and a second data port; wherein the lock controller is configured to enter into data communication via the second data port after successful completion of data communication via the first data port; and wherein the key controller is configured to conduct unencrypted data communication via the first data port and encrypted data communication via the second data port.

16. The electronic key of claim 15, wherein the key controller is configured to send identification data via the first data port and to transmit operational data messages via the second data port after a positive response indicating admissibility is received via the first data port.

17. The electronic key according to claim 15, wherein a first encryption key which is built-in encryption key is permanently stored on the key and the key controller is configured to use a second encryption key to encrypt lock operation instructions before a lock operation instruction is sent to the lock.

18. The electronic key according to claim 17, wherein the second encryption key is received via the second data port in the form of an encrypted message and the key controller is configured to retrieve the second encryption key using the built-in encryption key.

19. The electronic key according to claim 15, wherein the key comprises a lock interface which is configured for making mated connection with a key interface of the lock, wherein the key interface comprises the first data port and a third data port, and wherein the third data port is set at a DC voltage as a compatibility signal.

* * * * *